Sept. 13, 1927.  
P. SCHOONENBERG  
1,642,312
GLASS MANUFACTURING MACHINE AND METHOD
Filed Jan. 14, 1927
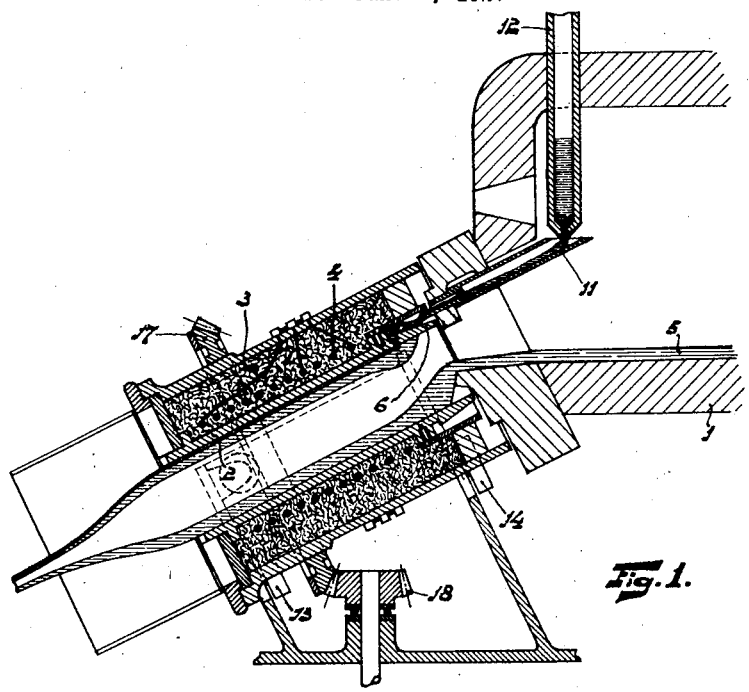
Fig. 1.
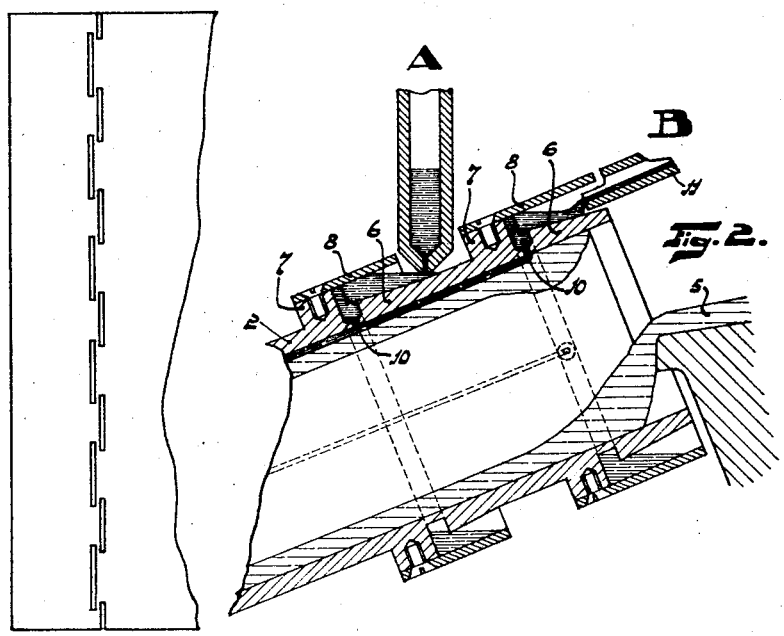
Fig. 2.
Fig. 3.
INVENTOR
P. Schoonenberg
by Langner, Parry, Card & Langner
Att'ys Patented Sept. 13, 1927.

1,642,312

UNITED STATES PATENT OFFICE.

PANCRAS SCHOONENBERG, OF EINDHOVEN, NETHERLANDS, ASSIGNOR TO N. V. PHILIPS' GLOEILAMPENFABRIEKEN, OF EINDHOVEN, NETHERLANDS.

GLASS-MANUFACTURING MACHINE AND METHOD.

Application filed January 14, 1927, Serial No. 161,205, and in the Netherlands, August 20, 1926.

This invention relates to a process of continuously drawing tubes or rods composed of several glass layers which are fused together. Indeed, it is in practice often desirable to coat glass tubes with a surrounding glass layer or to apply thereto a certain trade mark in the shape of a coloured stripe.

According to the invention, for this purpose various currents of glass are caused to flow on to a rotating member so as to form glass layers which are fused together after which the glass is drawn off the end of the said member into the shape of a tube or rod. For carrying out this operation there are various courses open. In the first place a current of glass may be fed and may be caused to form a glass layer on the member, after which glass in a fused state may be caused to flow on to said layer, the arrangement being such that the glass layers cover each other entirely or partially. It is, however, also possible to cause the current of glass to flow on to two different points of the surface of the member so as to be helically wound around each other and to permit of certain colouring effects being brought about. According to the invention it is also possible to feed one of the currents of glass on to the member by a stationary feeding device and one or more other currents of glass by one or more rotary feeding devices. The latter process enables a rectilinear ribbon or stripe to be produced on the surface of the drawn rod or tube.

The term "member" is to be understood to mean here equally well a mandrel-shaped body as a cylindrical body, either solid or coated with an entirely or partially covering layer (for example glass). The member may equally well be composed of one as of two parts, for example in the case of two members serving as glass distributors, and the layers thus formed uniting subsequently. The term "glass layer" is to be understood to mean equally well a ribbon-shaped as a stripe-shaped as a helical layer.

According to the invention one current of glass may be caused to flow on to the inner surface of a hollow body of revolution and the other current of glass on to the outer surface of the said body, the wall of the body being provided with apertures that permit the glass collected on the outer wall to flow towards the inner surface. The use of a hollow cylinder has an additional advantage in that the two glass layers can be heated simultaneously so that it is possible to heat them to the same temperature, which assists the homogenity of the product.

According to the invention the machine for drawing tubes and rods composed of several glass layers which are fused together comprises a rotary member and several feeding devices for feeding the various currents of glass. These feeding devices may be either all rotary or all stationary, the effect hereinbefore described (that is to say the striped tube or rod) being ensured by a combination of a stationary and a rotary feeding device.

According to an embodiment of the invention the wall of the member is provided with apertures that form part of a glass feeding device. In the case of a hollow, cylindrical or conical body of revolution being used the feeding devices may be so arranged that one current of glass flows on to the inner surface and the other current of glass on to the outer surface of the body, the wall of the body being provided with apertures which permit the glass collected on the outer surface to flow towards the inner surface. By reason of one current of glass flowing through the apertures on to the inner surface, the currents of glass thus produced will partially cover the other current of glass, which ensures that the drawn tube or rod will present stripes the number of which corresponds to the number of apertures provided in the wall of the cylinder. According to the invention if it is yet desired to manufacture in this manner a tube or rod composed of two layers surrounding each other entirely, the wall of the body of revolution may be provided with an annular fissure or with several ring segment-shaped fissures that overlap each other.

The accompanying drawings illustrate an embodiment of the invention. In the said drawings:

Figure 1 is a cross sectional view of a machine comprising a hollow rotary cylinder and a stationary and a rotary glass feeding device.

Figure 2 is a cross sectional view of a cylinder provided with several rotary glass feeding devices.

Figure 3 is a spread wall of the cylinder which is provided with a specially shaped fissure.

As shewn in the drawing the apparatus comprises essentially a glass furnace 1 and a hollow downwardly inclined rotary cylinder 2. This cylinder is journalled in bearings 13 and 14 and has seated on it a gear wheel 17 which meshes with a gear wheel 18 actuated by a source of energy (not shewn). The cylinder 2 is surrounded by insulating material 3 and a winding 4 which serves to electrically heat the wall of the cylinder. In addition the cylinder is provided with a conical part 6 which together with a collar 7 (Fig. 2) and a flat ring 8 forms a kind of reservoir into which glass is enabled to flow by means of chutes 11 and 12. These reservoirs communicate by means of apertures 10 with the cavity of the cylinder so as to permit the glass to flow from the reservoir on to the inner surface of the cylinder.

The process is carried out as follows:

The molten glass 5 will flow from the furnace 1 on to the rotary cylinder 2, whilst another current of glass (for example coloured glass) is being fed simultaneously on to the conical outer surface 6 of the cylinder 2. It will collect on the latter and flow through the aperture 10 of the wall of the cylinder 2. The glass thus entering will flow down the cylinder and contact closely with the other current of glass, so that it will cover the latter partially and be fused together with it. By then drawing the glass out into a tube or rod the surface of the latter will present a stripe or ribbon.

Figure 2 shows an embodiment of the invention comprising in addition to the ordinary glass supply two separate glass feeding devices, for example one for blue and one for red glass (A and B). Now, the apertures 10 may be provided in the surface of the cylinder so as to produce a certain combination of lines on the outer surface of the drawn tube or rod. If it is wished to apply to the tube instead of lines an entirely surrounding coat the wall of the cylinder may be provided with an annular fissure or this aperture may be given an outline as shewn in Figure 3 on the spread wall of the cylinder. The glass will flow through said fissures on to the inner surface of the cylinder and form there a separate coat which is fused together with the glass 5.

It will be apparent from the construction described that the apertures 10 rotate at the same rate as the cylinder 2. However, the part of the cylinder wall in which these apertures are provided may be mounted separately from the cylinder wall and may be given a relative motion relatively to the cylinder. It is thus possible to apply helical stripes on the tube and to vary their pitch. The rotary feeding device may also be constructed as a rotary chute which covers the glass coat formed on the member with another coat or squirts the latter on it.

It is evident that the invention is not limited to a hollow cylinder, it is also possible to cause glass to flow on to a rotary mandrel and either to feed a second current of glass on to the layer produced or to provide the surface of the mandrel with apertures that permit the second current of glass to issue and to unite with the former one.

What I claim is:

1. A method of continuously drawing tubes or rods being composed of several glass layers which are fused together consisting in supplying various currents of glass to a rotating member so as to form layers which are fused together, drawing the glass from the end of said member into the shape of a tube or rod.

2. A method of continuously forming tubes or rods composed of several glass layers which are fused together consisting in supplying various currents of molten material to different points of the surface of a rotating member, said currents forming layers on the surface of said member, the glass being drawn from the end of said member in a cylindrical form.

3. The method of continuously forming tubes or rods composed of several glass layers which are fused together consisting in permitting molten material to flow on the surface of a rotating member, said current forming a layer on said member, supplying a second current of molten material on said layer the method being such that the glass layers cover each other entirely or partially and drawing the glass of the end of said member into the shape of a tube or rod.

4. The method of continuously drawing tubes or rods composed of several glass layers which are fused together consisting in feeding a current of molten glass to the surface of a rotating member, at the same time feeding a second current to the surface of the same member, the two layers of glass being fused together on the member and drawing the glass from said member into the shape of a tube or rod.

5. A method of continuously drawing tubes or rods composed of several glass layers which are fused together, consisting in directing a flow of molten material from a stationary feeding device to the surface of a rotating member and directing at least one other current from at least one revolving feeding device to the surface of said member and drawing the glass from that member in a cylindrical form.

6. A method of continuously drawing tubes or rods composed of several glass layers which are fused together, consisting in supplying various currents of molten material to different points of the surface of a rotating cylinder said currents being all fed by rotating feeding devices and forming layers on the surface of said cylinder, the glass being drawn from the discharge end of said cylinder into the shape of a tube or rod.

7. A method of continuously drawing tubes or rods composed of several glass layers which are fused together consisting in directing a current of molten glass to the inner surface of a hollow cylinder at the same time directing another current to the outer surface of said cylinder, the various currents forming layers on the surfaces of said cylinder, the layer on the outer surface being supplied through apertures in the wall of said cylinder to the inner surface and drawing the glass of the end of said cylinder into the shape of a tube or rod.

8. A method of continuously forming tubes or rods composed of several glass layers which are fused together consisting in permitting a stream of molten metal to flow onto an inclined rotating mandrel, the stream of glass forming a layer on said mandrel directing a second and a third stream of glass on the so-formed glass layer and drawing the glass from the end of said layer into the shape of a tube or rod.

9. A method of continuously drawing molten material in cylindrical form, said material being composed of several glass layers fused together consisting in permitting molten glass to flow in a regulated stream on a rotating member disposed within a furnace, the glass winding itself around this member and being evenly distributed over the surface of same, permitting a second current of molten material to flow onto the layer on said rotating member said second current being evenly distributed over the glass layer of said member and drawing the glass from the end of said member into a shape of a tube or rod.

10. A machine for drawing tubes or rods composed of several glass layers which are fused together comprising a rotating member and at least two glass feeding devices.

11. A machine for drawing glass in cylindrical form, said glass being composed of several glass layers, comprising a rotating member, at least one stationary and at least one rotatable glass feeding device.

12. A machine for drawing tubes or rods composed of several glass layers which are fused together comprising a rotating member and at least two rotatable glass feeding devices.

13. A machine for drawing glass in cylindrical form said glass being composed of several glass layers fused together comprising a rotating member, the wall of said member being provided with apertures which form part of a glass feeding device and stationary means for directing a flow of molten glass on said member.

14. A machine for drawing tubes or rods composed of several glass layers which are fused together comprising a hollow cylinder and at least two means for directing a flow of molten glass on said cylinder, one of said means feeding the glass into the inner surface and the other means feeding the glass onto the outer surface of the cylinder, the wall of the cylinder being provided with apertures which permit the glass collected on the outer surface of the cylinder to flow towards the inner surface.

15. A machine for drawing tubes or rods composed of several glass layers which are fused together comprising a mandrel and at least two means for directing a flow of molten glass on said mandrel one of said means feeding the glass onto the outer surface of the mandrel and the other means being rotatable and directing molten material onto the same surface, said glass streams forming layers on said mandrel and being drawn off the discharge end of the mandrel.

16. The machine of claim 13 in which the apertures are formed by ring-segment shaped fissures that overlap each other.

17. The machine of claim 14 in which the apertures are formed by ring-segment shaped fissures that overlap each other.

In testimony whereof, I affix my signature at the city of Eindhoven, this 23rd day of December 1926.

PANCRAS SCHOONENBERG.